(12) United States Patent
Frost

(10) Patent No.: US 7,227,452 B1
(45) Date of Patent: Jun. 5, 2007

(54) APPARATUS TO DETER BIRDS WITH ULTRASOUND

(76) Inventor: James W. Frost, 746 Lundeberg, Santa Rosa, CA (US) 95407

(*) Notice: Subject to any disclaimer, the term of this patent is extended or adjusted under 35 U.S.C. 154(b) by 157 days.

(21) Appl. No.: 11/090,779

(22) Filed: Mar. 28, 2005

(51) Int. Cl.
G08B 3/00 (2006.01)
G08B 3/10 (2006.01)
G08B 23/00 (2006.01)
A01K 37/00 (2006.01)
A01K 45/00 (2006.01)
H04B 1/02 (2006.01)

(52) U.S. Cl. .............. 340/384.2; 340/384.1; 340/573.2; 119/329; 119/650; 119/712; 119/713; 119/719; 367/137; 367/139

(58) Field of Classification Search .......... 340/384.2, 340/628–632, 537.2; 119/712–713, 719, 119/329, 650; 367/137–139
See application file for complete search history.

(56) References Cited

U.S. PATENT DOCUMENTS

| | | | |
|---|---|---|---|
| 2,922,999 A | 1/1960 | Carlin | |
| 3,138,138 A | 6/1964 | Quittner | |
| 4,539,556 A * | 9/1985 | Dederich et al. | 340/515 |
| 4,563,759 A * | 1/1986 | Hayakawa | 367/139 |
| 4,658,386 A * | 4/1987 | Morris | 367/139 |
| 4,998,091 A * | 3/1991 | Rezmer | 340/384.2 |
| 5,214,619 A * | 5/1993 | Yoshida | 367/139 |
| 5,341,762 A | 8/1994 | Peterson | |
| 5,602,523 A * | 2/1997 | Turchioe et al. | 340/384.2 |
| 5,850,371 A * | 12/1998 | Jan | 367/139 |
| 5,894,818 A * | 4/1999 | Betzen | 119/712 |
| 5,966,075 A * | 10/1999 | Blanks | 340/573.2 |
| 6,016,100 A * | 1/2000 | Boyd et al. | 340/384.2 |
| 6,057,775 A * | 5/2000 | Sakurai et al. | 340/629 |
| 6,250,255 B1 | 6/2001 | Lenhardt | |
| 6,252,496 B1 * | 6/2001 | Jackson | 340/384.73 |
| 6,363,891 B1 * | 4/2002 | Marshall | 119/719 |
| 6,426,703 B1 * | 7/2002 | Johnston et al. | 340/628 |
| 6,522,254 B1 * | 2/2003 | Yamano | 340/630 |
| D472,488 S | 4/2003 | Job | |
| 6,570,494 B1 | 5/2003 | Leftridge | |
| 6,718,681 B2 * | 4/2004 | Bhullar | 43/1 |

* cited by examiner

Primary Examiner—Benjamin C. Lee
Assistant Examiner—Lam Pham

(57) ABSTRACT

Birds carry many parasites and other diseases, which pose a health risk to humans which come into contact with their habitat. However, ultrasonic waves agitate and deter birds and other pests from roosting in nearby areas. The disclosed device utilizes solar energy to power a battery pack, which in turn activates both a tone generator and its adjoining amplifier to create and emit the annoying ultrasound. In this way, birds are dissuaded from gathering in particular areas where the ultrasonic device is in use, and humans are provided a more healthy and disease-free environment.

1 Claim, 2 Drawing Sheets

APPARATUS TO DETER BIRDS WITH ULTRASOUND

BACKGROUND

1. Field

The present disclosure pertains to an apparatus which deters pigeons and other birds from roosting in a particular area via ultrasound.

2. Description of Related Art

The need for a device which keeps disease and pest-carrying animals away from buildings and other areas is well known in the art.

For example, the following U.S. Pat. Nos. 5,341,762, 6,250,255, 2,922,999 3,138,138, 6,570,494 and Des. 472,488 have described animal deterrent devices.

However, these other devices are different from the present apparatus in a variety of ways. The prior art either utilize microwave to deter pests, they require electricity sources or only use battery power, or they are large, industrial-size devices.

BRIEF DESCRIPTION OF THE FIGURES

The present invention is illustrated by way of example and not limitation in the Figures of the accompanying drawings.

DETAILED DESCRIPTION

The following description provides an apparatus that utilizes ultrasound to deter animals, especially birds, from nesting near human habitat. It will be appreciated, however, by one skilled in the art that the invention may be practiced without such specific details. Those of ordinary skill in the art, with the included descriptions, will be able to implement the apparatus that allows for deterring birds with ultrasound.

As previously described, various problems exist for prior bird deterrent devices. For example, they are free standing on poles, utilize only battery or electrical plug-in power, or use microwaves to deter pests. In contrast, in one aspect, the claimed subject matter depicts a compact circular apparatus that emits ultrasonic waves via a tone generator and amplifier system, and is powered by a battery that is activated by solar power-cells, and which is attachable to any surface.

Figure 1:
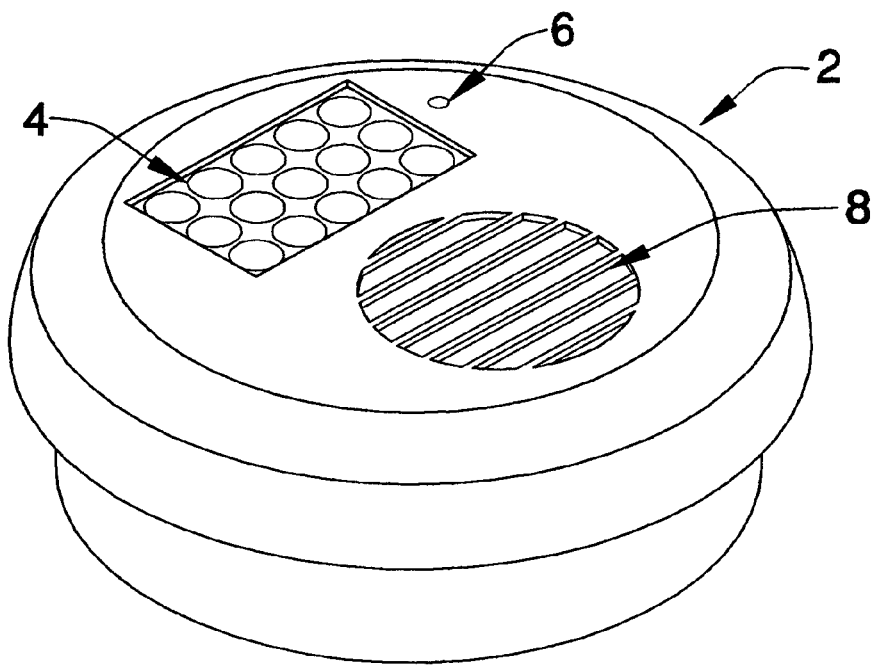
FIG. 1 illustrates a frontal view of the apparatus, depicting the solar cells and tone generator.

FIG. 1 illustrates an apparatus featuring, in one embodiment, a plastic circular device that measures 3 inches in diameter, and is 2.5 inches in height. On the top surface of the device's body 2, there is a circular tone generator 8 which emits the ultrasonic waves. The tone generator 8 has a slotted surface. Directly next to the tone generator 8 are a set of fifteen solar cells 4 that are aligned in a rectangular shape, and measures 3 cells high by 5 cells long. The solar cells 4 are circular in shape. On the shorter side of the solar cells 4 configuration is a small circular light indicator 6. A lit light indicator 6 notifies the user that the power is turned "on."

Figure 2:
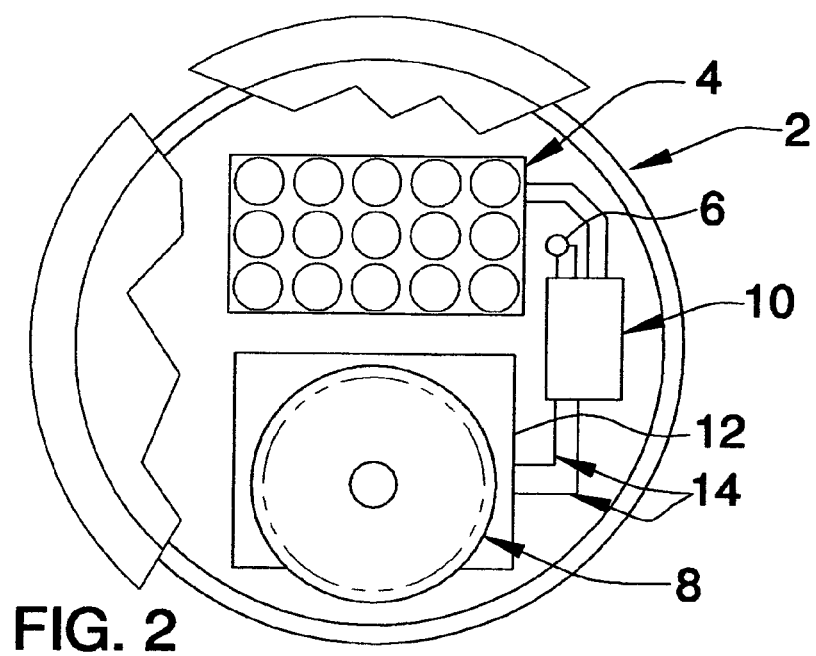
FIG. 2 illustrates a detailed cross-sectional view of the apparatus.
Figure 4:
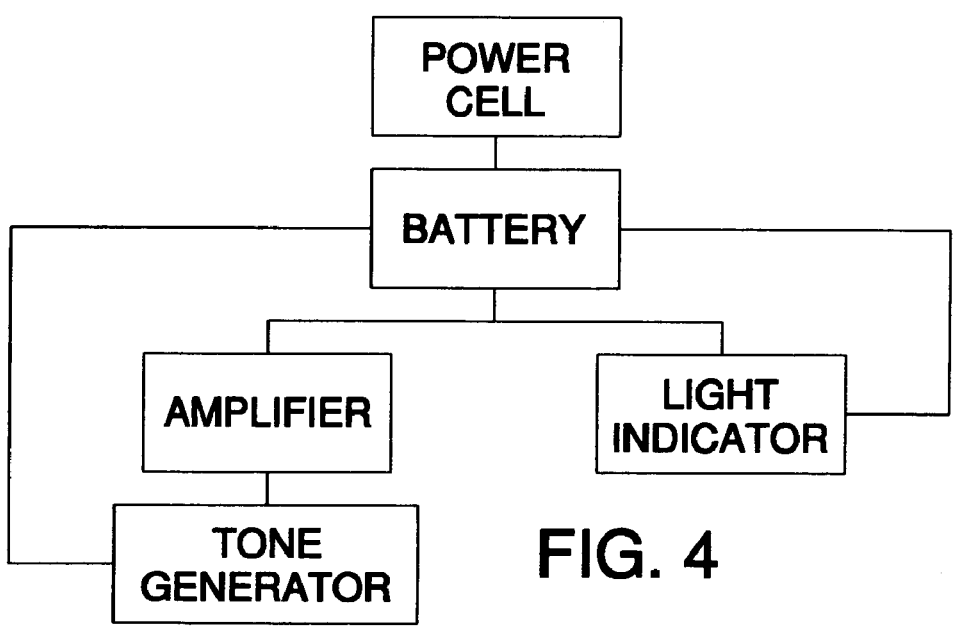
FIG. 4 illustrates a detailed view of the power system of the apparatus.

FIG. 2 illustrates an inside view of the operational aspects of the apparatus. At one end of the apparatus there is a circular tone generator 8 that emits the ultrasound. This rests on the square amplifier 12, that in turn attaches to two wires 14, a hot and a neutral wire. The wires 14 then attach laterally to the battery pack 10. The battery pack 10 is rectangular in shape, and activates the light 6, amplifier 12, and tone generator 8 as indicated in FIG. 4. The tone generator 8 and amplifier system 12 emit continuous ultrasound which annoys and thus deters pests from coming into close contact.

At the top of the apparatus in FIG. 2 the fifteen solar cells 4 are lined up as indicated in FIG. 1. These cells 4 generate power, and attach to the batter pack 10 via dual hot and neutral wires 14, charging the battery pack 10.

Figure 3:
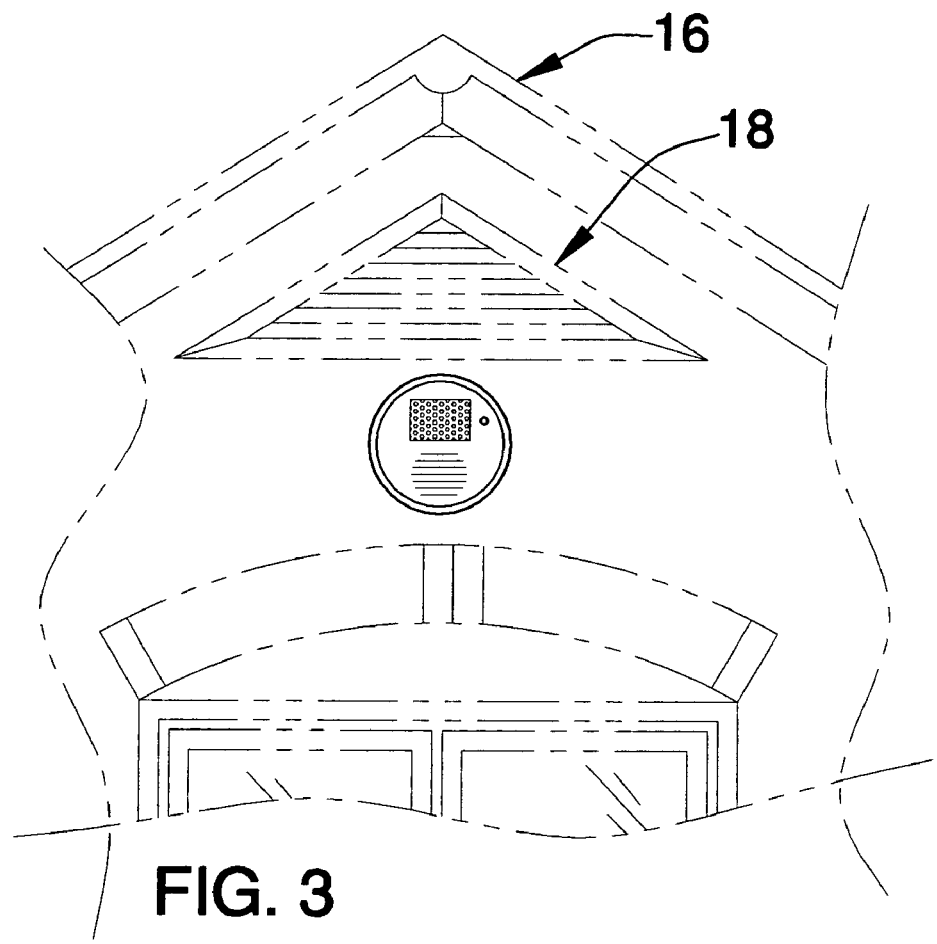
FIG. 3 illustrates the apparatus in use on the outside wall of a house.

FIG. 3 illustrates the ultrasonic device attached to the side of a house 16. Here, the apparatus attaches below an attic vent 18 under the eaves of a house's roof.

FIG. 4 illustrates the power distribution system of the apparatus. A power cell, activated by solar energy, powers the battery 10. The battery 10 in turn powers the amplifier 12 and tone generator 8, which work in tandem with each other. Finally, the battery 10 also provides the energy source for the light indicator 6.

Wile certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An ultrasonic pest control device, comprising:
    a plastic upper circular body, and a second smaller plastic circular body beneath, with a means for coupling said bodies;
    a slotted circular cut into the upper circular body, from which sound emits;
    a light indicator on said upper circular body;
    a plurality of solar cells aligned in a rectangular formation in a cut out in the upper plastic circular body, said solar cells generating energy for the device;
    a battery pack which absorbs energy from the solar cells;
    an ultrasonic tone generator, coupled to an amplifier, and;
    the tone generator to emit a tone to deter the pest.

* * * * *